United States Patent [19]

Snider

[11] 4,053,717
[45] Oct. 11, 1977

[54] CORDLESS TELEPHONE

[76] Inventor: David Eugene Snider, 11046 Negley, San Diego, Calif. 92123

[21] Appl. No.: 662,035

[22] Filed: Feb. 27, 1976

[51] Int. Cl.² .......................................... H04M 7/04
[52] U.S. Cl. .................................. 179/41 A; 325/64
[58] Field of Search ................. 179/41 A, 90 K, 15.5; 325/55, 64, 139, 425

[56] References Cited

U.S. PATENT DOCUMENTS

| 2,680,154 | 6/1954 | Dorff | 179/15.5 |
| 2,766,324 | 10/1956 | Peth | 179/15.5 |
| 2,894,121 | 7/1959 | Phillips | 343/180 |
| 3,366,880 | 1/1968 | Driver | 179/41 A |
| 3,459,899 | 8/1969 | Lane et al. | 179/84 |
| 3,586,978 | 6/1971 | Van Gorder | 179/41 A |
| 3,611,156 | 10/1971 | Ward | 325/492 |
| 3,644,681 | 2/1972 | Rice | 179/41 A |
| 3,769,593 | 10/1973 | Williams | 325/492 |
| 3,787,639 | 1/1974 | Battrick | 179/90 K |
| 3,865,994 | 2/1975 | Bender | 179/90 K |

Primary Examiner—Kathleen H. Claffy
Assistant Examiner—Gerald L. Brigance
Attorney, Agent, or Firm—Brown & Martin

[57] ABSTRACT

A cordless telephone including a Touch-tone signal generator module including ten buttons for initiating the generation of telephone switching signals representing ten numeric characters and two additional buttons; one of which is used for switching the cordless telephone into and out of a standby mode of operation in which a ring signal may be received and detected, and the other of which is used for providing off-hook and on-hook switching functions.

The telephone lines are seized in response to a discrete control signal transmitted from the cordless telephone, which discrete control signal has a low freqency below an audio frequency band within which audio signals and switching signals transmitted from the cordless telephone are passed onto the telephone lines. These signals are transmitted by frequency modulation.

The discrete control signal is summed with signals within the audio frequency band to provide a composite signal and an RF carrier signal is frequency modulated with the composite signal. Intermodulation between the discrete control signal and the audio and switching signals is prevented by providing a linear frequency deviation in response to amplitude variations in the composite signal.

14 Claims, 9 Drawing Figures

CORDLESS TELEPHONE

BACKGROUND OF THE INVENTION

The present invention generally pertains to telephone communications and is specifically directed to improvements in cordless telephones and cordless telephone systems relating to compactness, cost and signal interference.

A typical cordless telephone system includes a cordless telephone and a base unit. The base unit is connected to the telephone lines. The base unit includes an antenna, a transmitter and a receiver for communicating an RF carrier signal that is modulated by telephone switching signals and audio signals to and from the cordless telephone. The cordless telephone includes a speaker and a microphone, and also an antenna, a transmitter and a receiver for likewise communicating telephone switching signals and audio signals to and from the base unit via an RF carrier signal. The RF carrier signal transmitted by the cordless telephone has a different center frequency $f_c$ from the RF carrier signal transmitted by the base unit.

Switching signals representative of numeric characters are generated in the cordless telephone by operating a typical telephone mechanical dialing mechanism to generate dialing pulse signals. Switching signals for initiating "off-hook" and "on-hook" switching functions are generated by removing the telephone hand set from its cradle and by replacing the same respectively. In a typical prior art cordless telephone the removal of the hand set enables the transmitter and receiver in the cordless telephone to communicate signals to the base unit.

Upon enablement of the transmitter, a control signal is generated in the cordless telephone and transmitted to the base unit. Upon receipt and detection of the control signal the base unit seizes the telephone lines so as to enable audio signals and switching signals from the cordless telephone that are received by the base unit within a given audio frequency band to be passed onto the telephone lines.

In order to prevent interference when signalling the base unit so that a transmitted control signal does not cause an unrelated base unit in the same physical area to seize the telephone lines, the control signal is encoded as a discrete control signal having a predetermined frequency in or above the given audio frequency band, and the base unit enables the telephone lines to be seized only in response to the detection of such discrete control signal.

Cordless telephones typically are battery powered and include a switch for energizing or de-energizing the telephone so that the battery can be preserved when it is not desired to use the cordless telephone. When the cordless telephone is energized, it is enabled to receive and detect a "ring" signal from the base unit and to provide the ring signal to the speaker.

SUMMARY OF THE INVENTION

The cordless telephone in one preferred embodiment of the present invention may be made more compact in that it comprises a Touch-tone signal generator module for generating switching signals. The term "Touch-tone signal generator module" means the type of module presently used by those telephone companies in the Bell System for generating "Touch-tone" switching signals, that consist of a combination of two of a plurality of audio frequency tones. Such module includes a touch button pad having twelve buttons, ten of which are used for initiating the generation of signals representing ten numeric characters, and two additional buttons. In accordance with the present invention, one of the two additional buttons is adapted for operating a first control device within the cordless telephone for enabling and inhibiting energization of the cordless telephone to enable and inhibit the cordless telephone to receive and detect a "ring" signal from the base unit and to provide the ring signal to the speaker; and the second additional button is adapted for operating a second control device within the cordless telephone for enabling and inhibiting the transmitter in the cordless telephone, and for enabling and inhibiting the receiver in the cordless telephone to provide audio signals from the base unit to the speaker. In other words, the first additional button is used for switching the cordless telephone into and out of a "standby" mode of operation in which a ring signal may be received and detected; and the second additional button is used for providing the off-hook switching function to place the telephone in a "call" mode of operation, such as happens when the hand set of a typical non-cordless desk telephone is removed from its cradle. The on-hook switching function is also provided by the second additional button.

Thus, the inclusion of the Touch-tone signal generator module not only provides a cordless telephone that is more compact than cordless telephones having mechanical dialing mechanisms, but by utilizing the two additional buttons on the touch button pad to operate two essential control functions within the cordless telephone, all control and switching operations can be performed conveniently at the touch button pad.

Another improvement in cordless telephone systems provided by one preferred embodiment of the present invention is in the manner of encoding the discrete control signal used for enabling the base unit to seize the telephone lines. Accordingly, the discrete signal generator within the cordless telephone and the detector within the base unit are adapted for respectively generating and detecting a discrete control signal having a low frequency within a frequency range below the given audio frequency band within which switching signals and audio signals received from the cordless telephone are passed onto the telephone lines. The use of a low frequency for the discrete control signal makes it possible to use low cost active filters in the base unit detector for providing a narrow width frequency band within which the discrete control signal may be detected. Both the discrete signal generator and the detector are tunable so that a plurality of discrete low frequency control signals can be utilized by a plurality of unrelated cordless telephone systems within a close physical area within which signal interference otherwise would result.

An important feature of this preferred embodiment is the prevention of intermodulation of the low frequency discrete control signal and the transmitted audio and switching signals within the given audio frequency band. In such embodiments wherein the cordless telephone transmitter sums the discrete control signal with signals within the given audio frequency band to provide a composite signal, and frequency modulates an RF carrier signal with the composite signal, intermodulation is prevented by providing a linear frequency deviation in response to amplitude variations in the composite signal.

Security between unrelated systems is further enhanced in one preferred embodiment of the present invention wherein the cordless telephone generates and transmits dialing pulse signals instead of "Touch-tone" signals to the base unit and the base unit for passing the dialing pulse signals onto the telephone lines. In this embodiment, the cordless telephone includes an additional signal generator for generating a second discrete control signal having a frequency within or above the given audio frequency band for transmission to the base unit; the cordless telephone is enabled for transmitting the second discrete control signal and the dialing pulse signals only when both are simultaneously generated; and the base unit includes an additional detector for detecting the second discrete control signal, and is enabled for placing the dialing pulse signals onto the telephone lines only when the second discrete signal is detected.

In one version of this preferred embodiment, the cordless telephone includes a touch button pad having ten buttons for initiating the generation of dialing pulse signals representative of ten numeric characters, and the dialing pulse signal generator electronically generates dialing pulse signals in response to operation of the ten buttons. By providing a given number of low frequency discrete control signals in combination with a given number of second discrete control signals, the number of unrelated cordless telephone systems in the same physical area that can be securely operated about the same RF carrier $f_c$ during the transmission of dialing signals from the cordless telephone to the base unit without dialing signal interference is the multiple of these two given numbers.

DESCRIPTION OF THE PREFERRED EMBODIMENT

Figure 1:
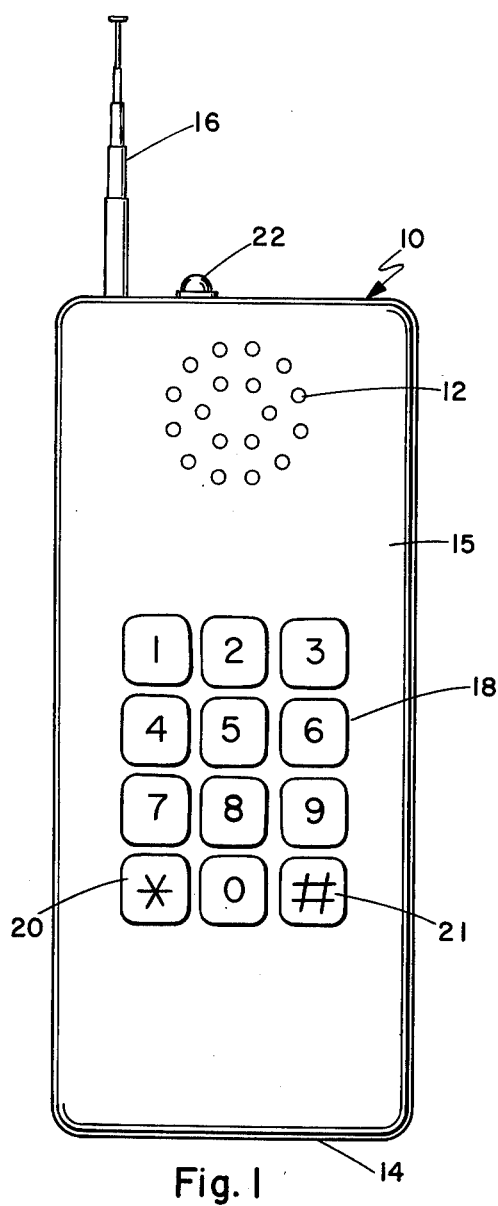
FIG. 1 is a front view of the cordless telephone of the present invention.

Referring to FIG. 1, the cordless telephone 10 is a compact hand held device which is used in the same manner as the hand piece of a telephone desk set. The cordless telephone 10 contains a speaker at location 12 and a microphone at location 14 within a plastic case 15. The cordless telephone 10 includes an antenna 16 and a Touch-tone pad 18. The Touch-tone pad 18 includes 12 buttons containing the symbols "1", "2", "3", "4", "5", "6", "7", "8", 37 9", "*", "0" and "#". The button 21 having the "#" symbol is the "standby" button. When it is first pressed, it places the cordless telephone in the standby mode and when it is pressed again standby power is removed from the cordless telephone. The button 20 having the "*" symbol is the "call" button. Once the telephone is in the standby mode, power can be provided to all components of the cordless telephone by pressing the call button 20. It may also be pressed again to return the cordless telephone to the standby mode.

The cordless telephone 10 also contains a lamp 22. When the telephone 10 is in the call mode, the lamp 22 provides a steady glow. When the cordless telephone 10 is in the standby mode, the lamp 22 flashes off and on at about a 2 second interval. When all power is removed from the cordless telephone, the lamp 22 does not glow.

The cordless telephone 10 is used in the following manner. To make a telephone call, first the telephone 10 must be placed in the standby mode by depressing the standby button 21. Then the call button 20 is depressed, thereupon a dial tone is heard from the speaker. The desired number then may be dialed by depressing the numeric symbol buttons on the Touch-tone pad 18. Once the call has been completed, in order to hang up the phone, the call button 20 is again depressed.

While the telephone 10 is in the standby mode, a ring signal may be heard from the speaker. To answer the telephone 10, one merely depresses the call button 20.

The operation of the cordless telephone is discussed with reference to FIG. 2.

Standby power is supplied from a battery 90 by depressing the "standby" button 21 on the touch button pad 18. The touch tone generator connector panel 76 has contacts "A", "B", "C", "D", "E", "F", "G" and "H". The diagram 76 illustrates which of these contacts are interconnected upon depression of each of the twelve buttons (which are identified in the left column thereof.). Thus, when the standby button 21 is momentarily depressed, contacts "C", "G" and "H" are interconnected and cause an AND gate 82 to provide a pulsed signal to the CLEAR input of a flip-flop 84. A signal is thereupon provided from the Q output of the flip-flop 84 through an OR gate 86 to a standby power control 88, which in turn provides a signal on line 89 for enabling a power amplifier 58, a 76 Hz bandwidth 1470 Hz active bandpass filter 62, a detector 64, a comparator 66 and a sampler circuit 72. The sampler circuit 72 then becomes free running at a rate of about 1.8 seconds and provides power at this rate on line 73 to the receiver module 43 in pulses having a width of about 40 to 50 milliseconds.

The receiver module 43 is a 26.97 to 27.27 MHz narrow band FM superheterodyne receiver utilizing a narrow band crystal filter on the front end, a crystal controlled local oscillator and a 455 KHz intermediate frequency system.

The receiver module 43 is connected to the antenna 16 and includes a 27 MHz 4-pole crystal filter 44, a 350 KHz bandwidth RF amplifier 46, a mixer 48, a 455 KHz local oscillator 50, a 14 KHz bandwidth 4-pole bandpass filter 52 and a limiter and discriminator 54. The receiver module 43 is enabled when power is provided to it on line 73.

To lessen reception of interference, the base unit receiver assigned frequencies are located between the citizens band service channels; and the receiver utilizes four pole crystal filters to limit the receiver front end bandwidth to 14 KHz. The base unit transmitter has frequencies assigned between the citizens band service channels 1 through 23 that have 20 KHz gaps, and the transmitted bandwidth is restricted to 10 KHz, thereby eliminating interference with citizens band channels 1 through 23.

When a ring signal is received from the base unit by the cordless telephone receiver 43, while operating in the standby mode, ta pulsed signal is provided on line 61 to the active bandpass filter 62. The ring signal is a 1470 Hz signal and the bandpass filter passes signals of this frequency (plus or minus 100 Hz) to the detector 64. A detected ring signal is then provided on line 65 to the comparator where it is compared with a reference voltage $V_R$ provided on line 67. Upon sensing a ring signal for approximately 10 msec., the comparator 66 provides a signal on line 71 to the sampler circuit 72 so as to latch the sampler circuit 72 into a mode of operation in which steady state power is provided to the receiver module 43 while the "ring" signal is being received. Upon the comparator 66 sensing that a ring signal is present, a signal also is provided on line 69 to enable the power amplifier 58 to provide the ring signal from the active bandpass filter 62 on line 63.

Also while the cordless telephone is in the standby mode, a signal is provided from the $\overline{Q}$ output of the flip-flop 84 on line 85 to an oscillator and filter circuit 36 to enable the latter to provide a low frequency discrete control signal on line 35 to the cordless telephone transmitter circuit, when the transmitter circuit is energized.

When the call button 20 is monentarily depressed, contacts "A", "G" and "H" are interconnected, thereby causing an AND gate 92 to provide a pulsed signal to the CLEAR input of a flip-flop 94, which in turn provides a signal at its $\overline{Q}$ output. This signal is provided on line 95 to the transmitter power switch 96 so as to enable the switch 96 to provide power on a line 97 to the touch tone signal generator 78, the oscillator and filter circuit 36 and the transmitter circuit of the cordless telephone.

The oscillator and filter circuit 36 continuously modulates the RF carrier of the cordless telephone with the low frequency discrete control signal when the cordless telephone transmitter is turned on. The low frequencies are less than the lower end of the audio frequency band that is passed onto the telephone lines by the base unit (less than 300 Hz). Low band discrete frequencies preferably are selected in a range of 22 Hz to 100 Hz. Because this range is used, low Q, low cost tunable active filter networks can be utilized to maintain a very narrow bandwidth comparable to single tuned devices. Therefore in a given range, several units could operate on the same carrier frequency $f_c$ without line seizure interference. The number of units that could be operated in the same area would be the product of the number of discrete low frequencies used times the number of different carrier frequencies available.

The separation between the low frequency discrete control signals is a function of the Q of the active bandpass filter 106 in the base unit. A practical value of Q at minimum cost is 15. The equation for the realtionship of consecutive low discrete frequencies is $$f_2 = f_1/(1 - 1/Q).$$

Although the discrete low frequency may be one of several in the low frequency range of approximately 22 Hz to 100 Hz, for purposes of discussion herein, it is referred to as a 30 Hz low frequency discrete control signal.

Figure 6B:
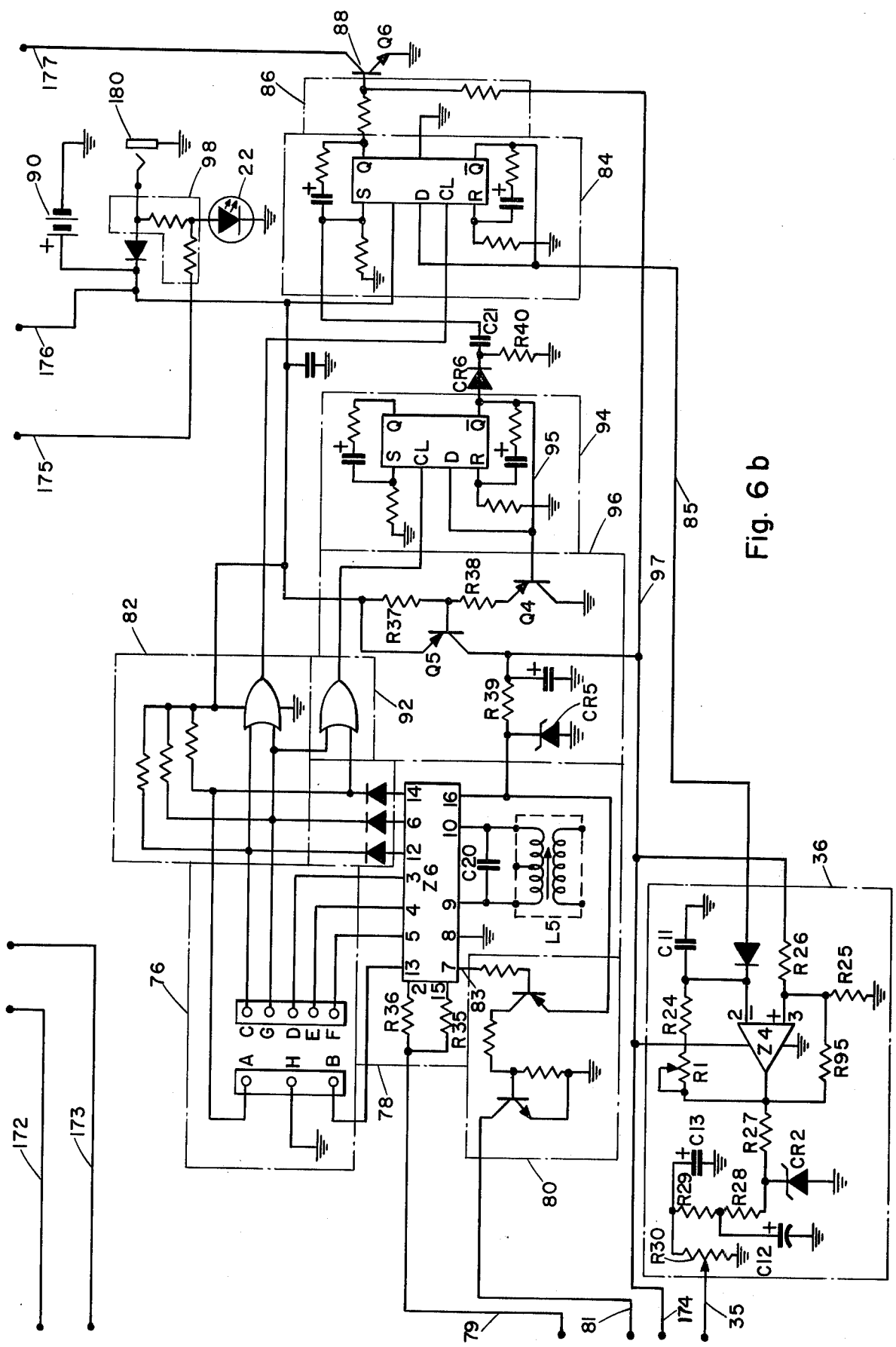
Figure 7:
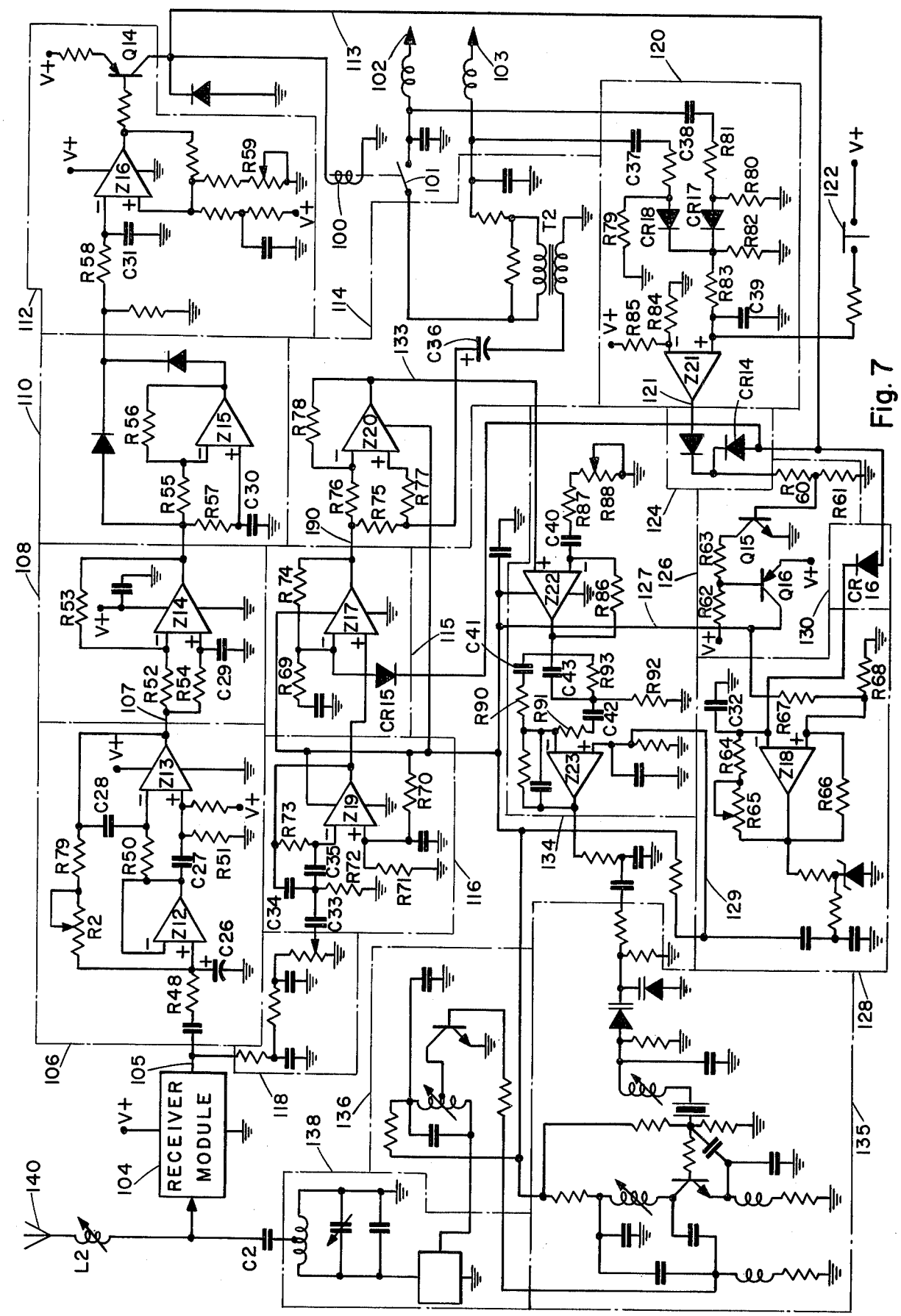
FIG. 7 is a schematic circuit diagram of the base unit as shown in FIG. 3.

The cordless telephone and base unit may be tuned to the particular selected low frequency by tuning the potentiometer R1 in the cordless telephone oscillator and filter circuit 36 (FIG. 6b) and by tuning the potentiometer R2 in the base unit active bandpass filter 106 (FIG. 7).

The cordless telephone transmitter circuit includes a preamplifier 28, an automatic level control 30, a pre-emphasis network 32, a summing amplifier 34, a voltage controlled crystal oscillator (VCXO) and tripler circuit 38, a final stage amplifier 40 and a bandpass filter 42. The output of the transmitter circuit is coupled through capacitor C1 and inductor L1 to the antenna 16. The automatic level control 30 limits the amount of modulation plus allows a varible acoustical level to the microphone 26 while maintaining a fixed modulation. The output of the automatic level control 30 is fed to a pre-emphasis network 32 with a reference of 3.0 KHz peak-to-peak. The output of the pre-emphasis network is fed to a summing amplifier where the 30 Hz discrete control signal is added to form the composite signal. This composite signal is fed to the voltage controlled crystal oscillator and tripler circuit 38 with the 30 Hz tone modulation set at approximately 1.5 KHz peak-to-peak. The maximum deviation at 2500 Hz is a 8 KHz peak-to-peak, yielding a necessary bandwidth of 13 KHz. A single tuned class C final stage amplifier 40 and a 14 KHz two pole bandpass filter follow provided.

The signal provided at the $\overline{Q}$ output of the flip-flop 94 when the cordless telephone transmitter circuit is energized is also transmitted to the SET input of the flip-flop 84 to effect a change in the state of the signals provided at the Q and $\overline{Q}$ outputs thereof. However, at the same time the transmitter circuit is energized, the signal provided on line 97 by the transmitter power switch 96 is also applied through the OR gate 86 to the standby power control 88 so as to enable power to be continued to be provided to the power amplifier 58 and to the receiver module 43 via the sampler circuit 72. This signal on line 97 is also then provided to the detector 64 to inhibit the same.

When the call button 20 is next depressed again, the state of the signal at the $\overline{Q}$ output of the flip-flop 94 is changed, thereby causing the transmitter power switch 96 to remove power from the transmitter circuit. Also the inhibiting signal to the detector 64 is removed. However, power is continued to the receiver module 43 and the power amplifier 58 even though the signal provided from line 97 to the standby power control 88 is discontinued, because the change of state in the signal at the $\overline{Q}$ output of the flip-flop 94 causes a change of state in the signal at the Q output of the flip-flop 84, which in turn causes the standby power control 88 to continue to provide a power enabling signal on line 89.

Figure 3:
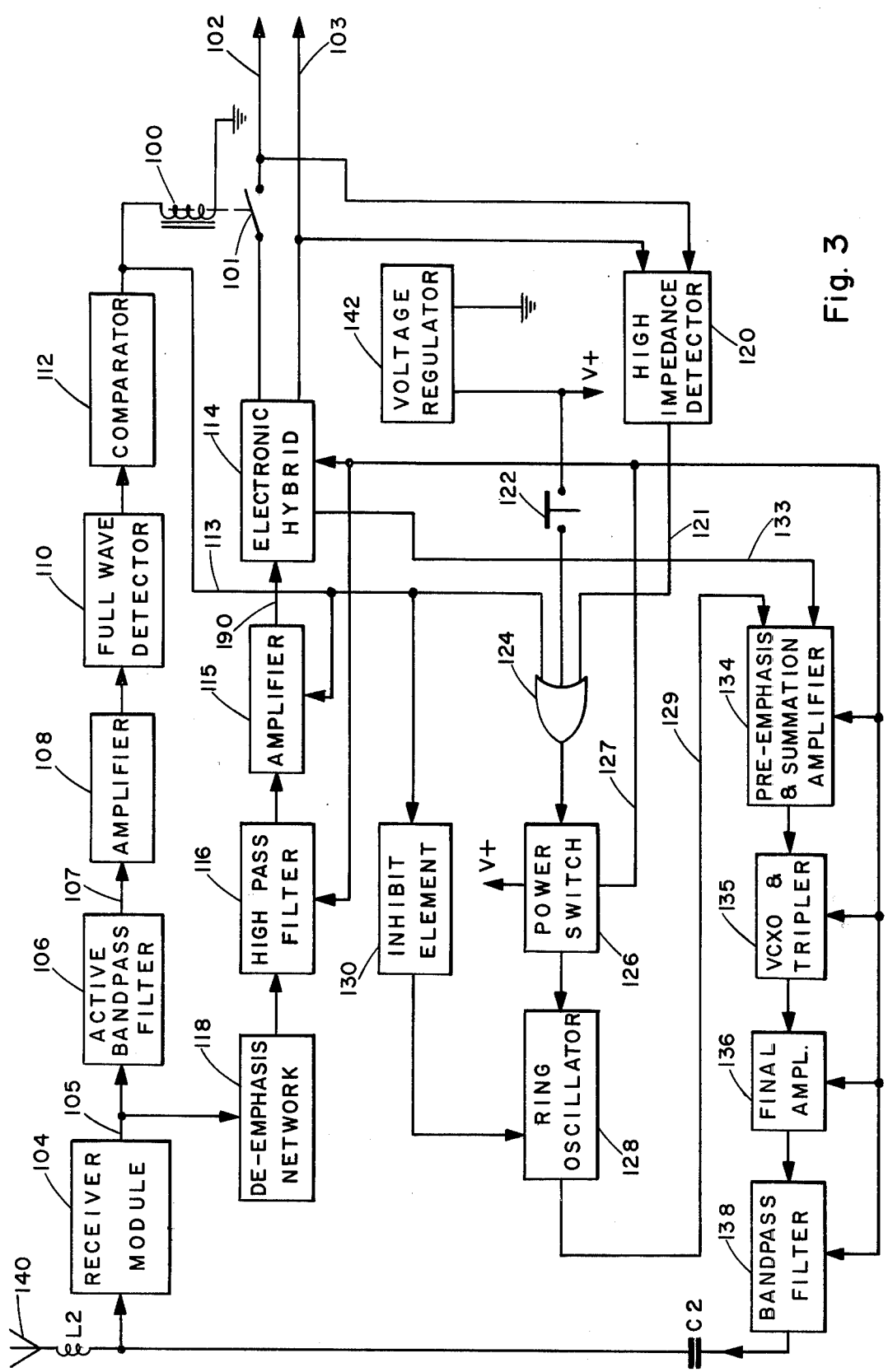
FIG. 3 is a block diagram of the base unit of the cordless telephone system according to the present invention.

When the standby button 21 is next depressed again, the state of the signals at the Q and $\overline{Q}$ outputs of the flip-flop 84 are changed to cause the standby power control to remove power from the receiver module 43 and the power amplifier 58. While the transmitter circuit of the cordless telephone is energized, both audio signals and telephone switching signals may be transmitted to the base unit (FIG. 3).

The 30 Hz low frequency discrete control signal provided on line 35 from the oscillator and filter circuit 36 is transmitted to the base unit when the call button 20 is first depressed to energize the cordless telephone transmitter circuit. Voice signals are initiated at a condensor microphone 26 and passed through the preamplifier circuit 28, the automatic level control 30, and the pre-emphasis network 32 to the summing amplifier 34 wherein they are summed with the low frequency discrete control signal to provide the composite signal to the VCXO and tripler circuit 38, wherein a frequency modulated RF carrier signal is generated for transmission to the base unit.

"Dialing" signals are initiated by depressing the touch buttons having numeric symbols, thereby causing representative combinations of signals to be provided from the contacts A-H to a touch tone generator 78. Switching signals are generated by the Touch-tone generator 78 and provided on line 79 to the pre-emphasis network 32 from which they are transmitted on line 33 to the summing amplifier 34.

The Touch-tone signal generator is a "2 of 8" tone generator that is compatible for use with the "Bell Telephone System". The frequency tone combinations that are generated when the buttons are depressed are as follows

| Button | Low Band | High Band |
| --- | --- | --- |
| 1 | 697 Hz | 1209 Hz |
| 2 | 697 | 1336 |
| 3 | 697 | 1477 |
| 4 | 770 | 1209 |
| 5 | 770 | 1336 |
| 6 | 770 | 1477 |
| 7 | 852 | 1209 |
| 8 | 852 | 1336 |
| 9 | 852 | 1477 |
| 0 | 941 | 1336 |
| * | 941 | 1477 |
| # | 941 | 1209 |

While switching signals are being provided on line 79, the Touch-tone generator also cause a muting circuit 80 to provide a muting signal on line 81 to the automatic level control 30 so as to mute any voice signals that might then be generated in the mircrophone.

The base unit is connected directly through a telephone company interface unit to the telephone lines. The base unit includes a 26.97 to 27.27 MHz narrow band FM receiver, a narrow band FM transmitter and audio processing circuitry. Until the cordless telephone commands the base unit to seize the telephone lines in order to place or to receive a telephone call, the telephone lines are disconnected from the base unit.

Referring to FIG. 3, when the RF FM signal transmitted from the cordless telephone is received by the antenna 140, it is demodulated in the receiver module 104. Receiver module 104 is essentially the same as receiver module 43 of the cordless telephone, with the exception of a 200 KHz difference in center frequencies. When the base unit receives a carrier frequency modulated with the 30 Hz low frequency discrete control signal of approximately 1.5 kilohertz peak-to-peak deviation, relay coil 100 will be energized after a two second delay.

The low frequency discrete control signal is passed by the active bandpass filter 106 through an amplifier 108 to a full wave detector 110 and a comparator 112. Upon the discrete control signal being sensed, the comparator 112 causes a relay 100 to close switch 101 to seize the "tip" and "ring" telephone lines 102 and 103. Upon seizure of the telephone line, an approximately 115 ohm direct current path and a 600 ohm alternating current path is provided to the tip and ring lines 102, 103.

When the low frequency discrete control signal is sensed, a signal also is provided on line 113 to an inhibit element 130 and to a power switch 126 via an OR gate 124. The signal to the inhibit element 130 causes the ring oscillator 128 to be inhibited, thereby terminating the provision of a ring signal to the cordless telephone, if in fact one was then being transmitted.

The signal received by the power switch 126 from the comparator 112 causes the power switch 126 to provide a signal on line 127 for enabling power to be provided to the transmitter circuit of the base unit and to the electronic hybrid circuit 114 and high pass filter 116. The base unit transmitter circuit includes a pre-emphasis and summation amplifier 135, a VCXO and tripler circuit 135, a final stage amplifier 136 and a bandpass filter 138.

Upon the power enabling signal being provided from the power switch 127, an audio signal demodulated from the received RF carrier signal flows through the de-emphasis network 118, the high pass filter 116 and the amplifier 114 to the electronic hybrid circuit 114. The hybrid circuit passes the audio signal onto the telephone lines 102, 103 and also provides a side tone signal on line 133 to the pre-emphasis and summation amplifier 134 for transmission back to the cordless telephone.

A "ring" signal may be provided by the ring oscillator 128 on line 129 to the pre-emphasis and summation amplifier 134 for transmission to the cordless telephone in response to either of two conditions. The ring oscillator 128 can provide a ring signal on line 129 only when it is not inhibited by element 130 in response to the sensing of the low frequency discrete control signal by comparator 112. When not so inhibited, the ring oscillator may provide a ring signal on line 129 either when a page switch 122 connecting the ring oscillator 128 to a voltage regulator 142 via the power switch 126 and the OR gate 124 is closed, or when a ring signal is received on the telephone lines 102, 103 and detected by a high impedance detector 120, which in turn provides an enabling signal to the ring oscillator 128.

Audio signals received by the base unit from the telephone lines 102, 103 are provided on line 133 to the base unit transmitter circuit for transmission to the cordless telephone via capacitor C2, inductor L2 and antenna 140. The base unit power supply includes a low voltage transformer which is coupled to a 115 volt AC outlet.

Referring again to FIG. 2, should the "standby" button 21 be depressed to remove "standby" power from the cordless telephone while the transmitter circuit is still energized in response to a depression of the call button 20, the transmission link between the cordless telephone lines 102, 103 will nevertheless be broken, since such depression of the standby button 21 causes the output signal from the $\overline{Q}$ output of the flip-flop 84 to inhibit the oscillator and filter circuit 36 from providing the low frequency discrete control signal on line 35 for transmission to the base unit. Once the low frequency discrete control signal is no longer received by the base unit the comparator 112 causes the relay 100 to open the switch 101 to release the base unit from the telephone lines 102, 103.

The alternative embodiment wherein a second discrete control signal is utilized, is discussed with reference to FIGS. 4 and 5.

Figure 4:
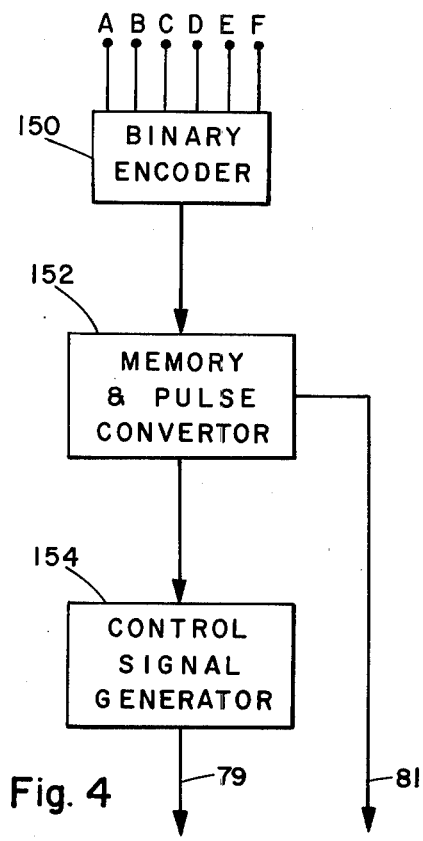
FIG. 4 is a block view of a portion of the cordless telephone which is substituted for a portion thereof as shown in FIG. 2, for inclusion in the preferred embodiment wherein the high frequency discrete control signal is employed.
Figure 2:
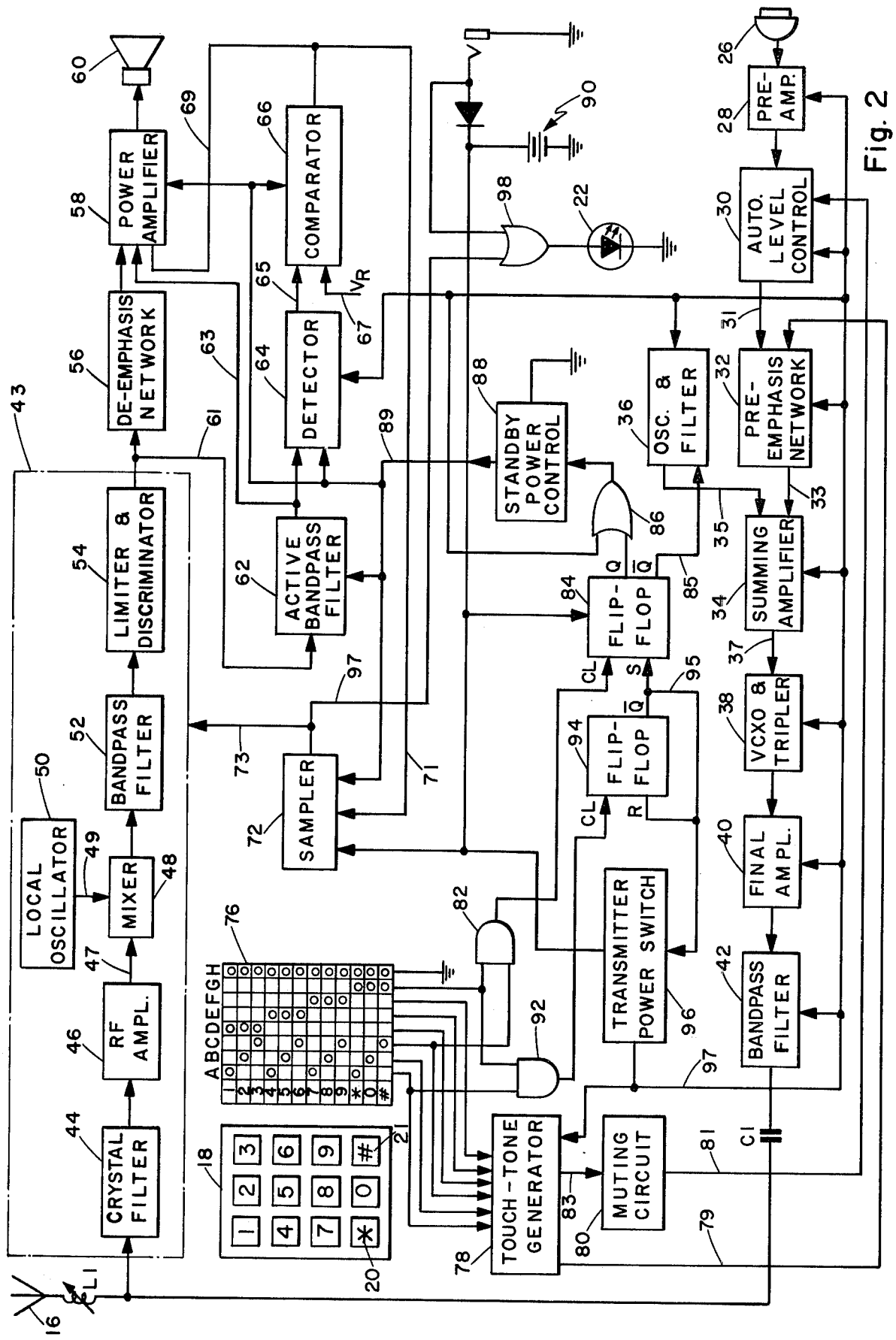
FIG. 2 is a block diagram of the cordless telephone of the present invention.

Referring first to FIGS. 2 and 4, a binary decoder 150, a memory and pulse converter 152 and a signal control generator are substituted for the touch tone generator 78 and muting circuit 80. The binary encoder is connected to contacts "A" – "F" of the touch tone pad 76.

In response to depression of the Touch-tone buttons having numeric symbols, the binary encoder 150 provides corresponding signals to the memory and pulse converter 152, wherein a series of pulses corresponding to the numeric symbol on the button is electronically generated and provided to the control signal generator 154. The second, or high frequency discrete control signal, is generated by the control signal generator 154 only when enabled by an electronically generated dialing pulse from the memory and pulse convertor 152. Thus, the high frequency discrete control signal and the dialing pulse signals are provided on line 79 to the pre-emphasis network for transmission to the base unit only when both are generated simultaneously. While the dialing pulse signals are provided by the memory and pulse convertor 152, a muting signal is also provided on line 81 to the automatic level control 30 to mute any interferring voice signals or other noise from the microphone 26.

Figure 5:
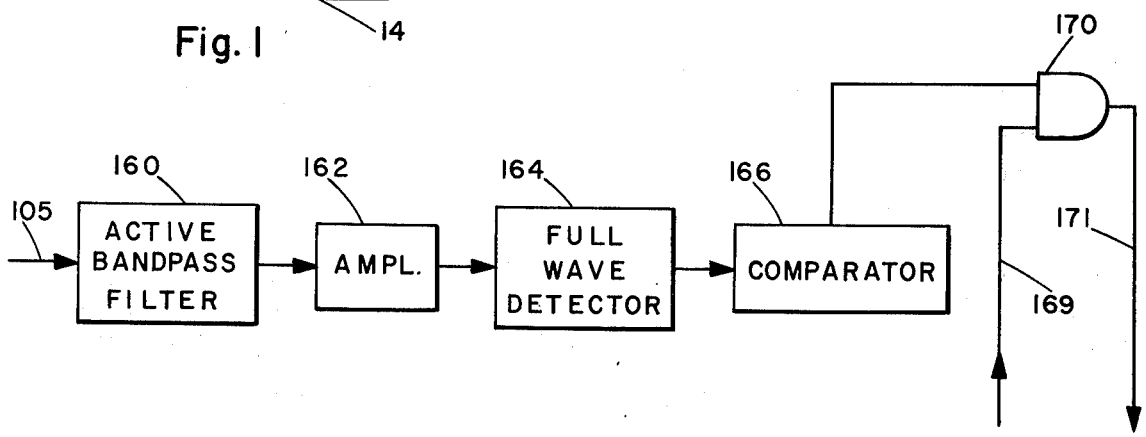
FIG. 5 is a block diagram of the portion of the base unit which is modified from the embodiment as shown in FIG. 3 for inclusion in the preferred embodiment wherein the high frequency discrete control signal is employed.

Referring to FIGS. 3 and 5, the base unit is modified by connecting a series of components (an active bandpass filter 160, an amplifier 162, a full wave detector 164 and a comparator 166) for detecting the second high frequency discrete control signal in parallel with those components 106, 108, 110, 112 utilized for detecting and sensing the low frequency discrete control signal. Instead of the output of the low frequency discrete control signal comparator being connected directly to the relay coil 100 as shown in FIG. 3, it is coupled to the coil 100 through an AND gate 170 via lines 169 and 171. Accordingly, the relay coil 100 is closed to seize the telephone lines 102, 103 only when a high frequency discrete control signal is sensed by the comparator 166 simultaneously with the sensing of a low frequency discrete control signal by the comparator 112.

The high frequency discrete control signals are in a band of from 2200 to 3200 Hz, with frequencies in the band of 2450 to 2750 Hz being avoided to comply with telephone company specifications.

Figure 6A:
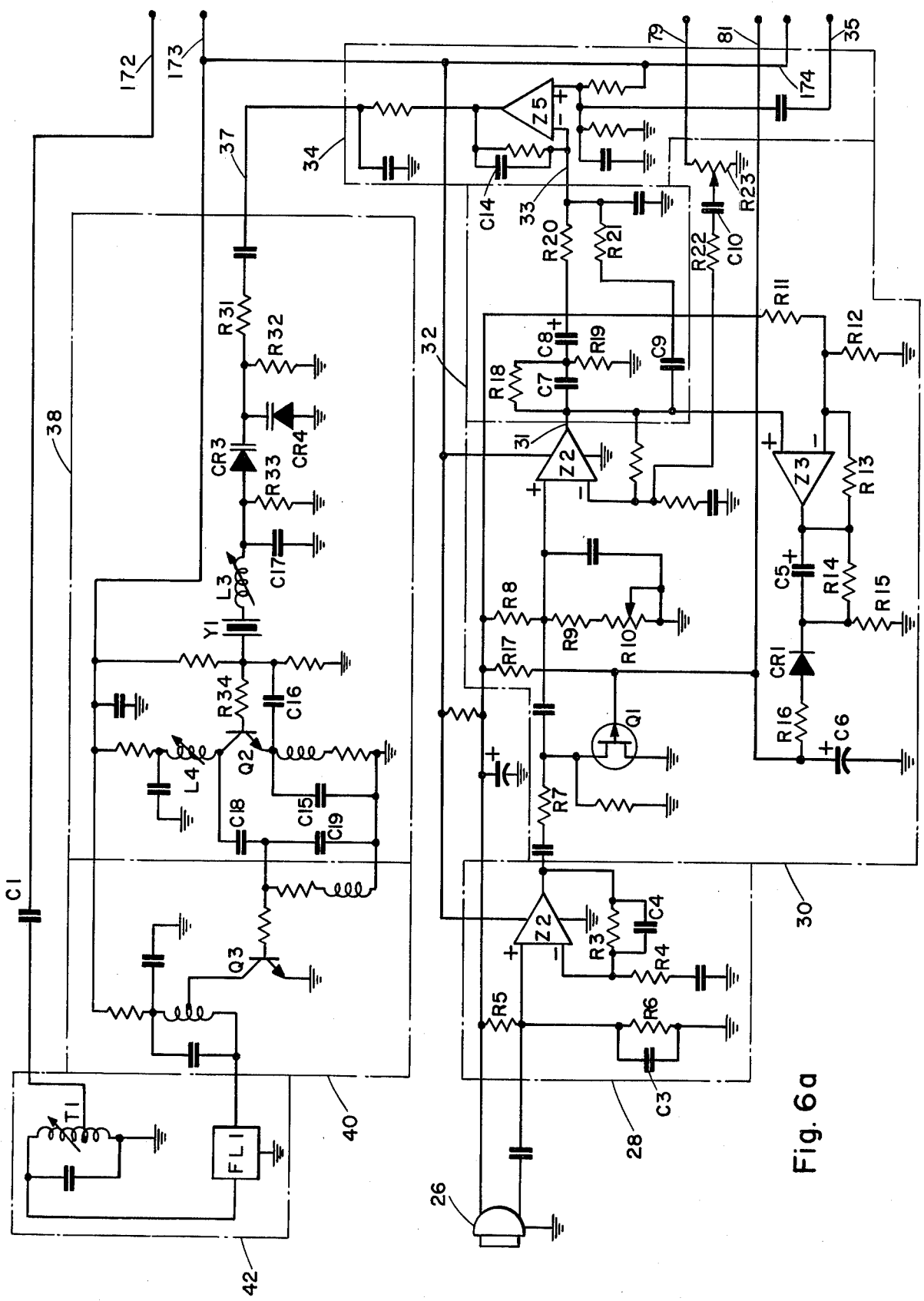
FIGS. 6a, 6b, and 6c are a schematic circuit diagram of the cordless telephone as shown in FIG. 2.
Figure 6C:
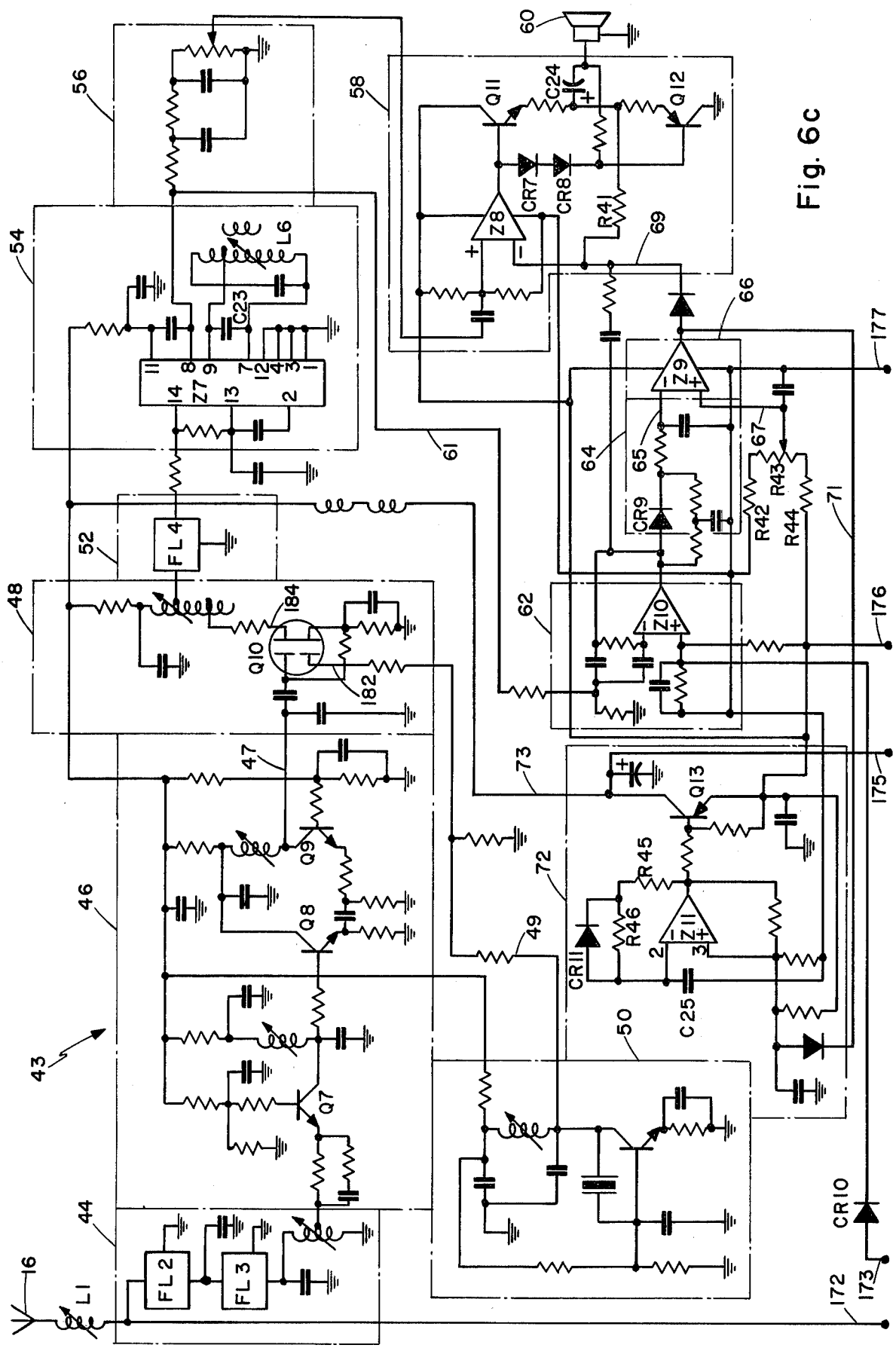

The schematic circuit diagram of the cordless telephone is best viewed by laying out the sheets of Drawings containing FIGS. 6a, 6b and 6c and joining them at lines 35, 79, 81 and 172-176.

The microphone 26 output signal is approximately 10 to 15 mvolts peak-to-peak for a voice sound source that is about 10 cm from the microphone.

In the preamplifier circuit 28, the operational amplifier Z1 is gain limited to 10 by the ratio of resistances R3 and R4. A low pass network consisting of R5 in parallel with capacitor C3 and resistor R6, in conjunction with the real output of the microphone 26 provides a 6 db per octave roll off for frequencies above the 2500 Hz audio band. Capacitor C4 and resistor R3 provide a second breakout frequency of 4000 Hz to further remove noise and any RF interference radiated to the cordless telephone.

The automatic level control 30 operates to maintain the maximum peak voltage levels on line 31 at the output of amplifier Z2. This circuit 30 has a rise time of 5 msec and a relatively slow release time of 1 second. Resistor R7 and field effect transistor Q1 act as an attenuator. The dynamic range of the attenuator is 39 db. Once the audio signal passes through the attenuator, amplifier Z2 increases the signal level 34 db. Resistors R8, R9 and R10 set the DC level on line 31 at the output of amplifier Z2. The signal at the output of amplifier Z2 is fed around a peak detecting closed loop path to degeneratively control the DC voltage applied to the gate of transistor Q1. This controls the gain of the automatic level control 30 by the maximum peak amplitude seen in a complex burst of signals. Resistors R11 and R12 set the reference for the peak detector loop. The peak detector loop includes amplifier Z3, resistors R13, R14, R15, R16 and R17, capacitor C5 and diode CR1. When a zero signal input to the automatic level control 30 exists, the capacitor C6 charges to the supply voltage level through resistor R17, thereby causing the transistor Q1 to be cut off and thus increasing the gain of the loop to the maximum. Resistor R10 may be set to adjust the maximum peak level on line 31. The output signals on line 79 from the Touch-tone signal generator 78 are summed into the amplifier Z2 of the pre-emphasis network 30 via resistor R22, capacitor C10 and tone level control R23. The touch tone pairs of signals are fed through the pre-emphasis network 30 to maintain a flat response through the system.

The pre-emphasis network 32 consists of resistors R18, R19, R20 and R21 and capacitors C7, C8 and C9. This network 32 causes an increase in the transfer function gain of the network versus frequency. This provides signal conditioning for translating an FM transmitter to a near phase modulated transmitter.

When any of the Touch-tone pad buttons are depressed, a low level signal appears on line 83 from the Touch-tone generator 78 to the muting circuit 80. In response thereto the muting circuit 80 causes the gate of transistor Q1 in the automatic level control 30 to be grounded via line 81 from the muting circuit, thereby muting any signal from the microphone 26 during the generation of switching signals from the touch tone generator 78.

Referring to the oscillator and filter circuit 36, a 30 Hz square wave oscillator is made up of an operational amplifier Z4, potentiometer R1, resistors R24, R25, R26, R95 and capacitor C11. The frequency remains stable with temperature and supply voltage variations since the switching voltages are derived from a ratio of power voltages at the differential input pins 2 and 3 of the operational amplifier Z4; and the frequency determining components (capacitor C11, potentiometer R1 and resistor R24) have low temperature coefficients. The square wave output from the operational amplifier Z4 varies in amplitude with supply voltage. Resistor R27 and zener diode CR2 are used to maintain a stable amplitude. Resistor R28 and capacitor C12 form a low pass filter which changes the square wave to a near triangular wave. A second low pass filter formed by resistor R24 and capacitor C13 develop a sinusoid across resistor R30 to provide the 30 Hz low frequency discrete control signal on line 35.

The summing amplifier 34 includes an operational amplifier Z5. The composite signal output of the amplifier Z5 is cornered at 2500 Hz by capacitor C14 and is provided on line 37 to the VCXO and tripler circuit 38.

The VCXO includes a modulator section for providing a linear frequency deviation in response to variations in the amplitude of the composite signal. The modulator section includes an active transistor Q2, a piezoelectric crystal Y1, inductor L3, varactors CR3 and CR4, capacitors C15, C16, C17 and resistors R31, R32, R33 and R34. The varactor CR4 is connected in series with resistor R31 for receiving the composite signal from the summing amplifier 34. The varactor CR4 has its cathode connected to the resistor R31. A resistor R32 is connected between the varactor CR4 cathode and ground to provide a high resistance current return path for the varactor CR4. The varactor CR3 has its cathode connected to the cathode of the varactor CR4 and its anode coupled to ground through resistor R33, which provides a high resistance current return path for the varactor CR3. The variable inductance L3 is connected between the anode of varactor CR3 and the piezoelectric crystal Y1. The inductance L3 is coupled to ground through capacitor C17. Transistor Q2 has its base connected in series with the crystal Y1 through resistor R34, and its emitter coupled to ground through capacitor C15. Capacitor C16 is connected between the emitter and the base resistor R34 of the transistor Q2 for sustaining the frequency modulated signal.

The VCXO frequency is one-third of the transmitter output frequency so as to allow wider frequency deviation through tripling. Since the piezoelectric crystal Y1 is the major factor in determining the oscillator's rest frequency, variations in the varactor capacities due to the composite audio voltage across the varactors CR3 and CR4 causes only a slight change in the oscillator frequency (approximately 0.012% for a 3.5 volt peak-to-peak signal). The parallel combination of the inductance L3 and the capacitance C17 appears inductive when the circuit is tuned to the greatest frequency deviation versus audio level sensitivity. Obtaining higher deviation sensitivities reduces the amount of audio distortion throughout the system since lower peak voltage swings are necessary to change the varactor capacity. To accomplish this, the value of the inductance L3 is selected to cause the crystal Y1 to oscillate in a frequency range below its series natural resonance frequency. Also, the varactors CR3 and CR4 do not have any DC bias. Thus, when the capacitance of the varactor CR4 increases in response to a negative amplitude of the composite signal becoming more negative, the resistance R31 combines with the impedance of the varactor CR4 to attenuate the amplitude of the composite signal so as to maintain a linear frequency deviation in response thereto.

The tripler circuit is made up of the collector circuit of transistor Q2, inductor L4, and capacitors C18 and C19. The RF signal is provided from the junction of capacitors C18 and C19 to present a low impedance drive to the class C final stage amplifier 40.

Within the final stage amplifier 40, the collector of the transistor Q3 is tuned to approximately 27 MHz.

The bandpass filter 42 includes a crystal filter FL1 which has a bandwidth of about 14 KHz, less than 1 $db$ insertion loss, and an output impedance at 27 MHz of about 1300 ohms. The crystal filter FL1 limits spurious signal outputs such as the noise floor of the VCXO and the final stage amplifier. The transformer T1 transforms the real value of the antenna and coil losses to approximately 45 milliwatts of power.

The Touch-tone generator 78 includes a Motorola Model Mc 14410P integrated circuit Z6 for generating the combinations of frequency tone switching signals on line 79. The pin designations for this integrated circuit Z6 are as shown in FIG. 6b. The low band and high band quasi-sine wave output signals are summed through resistors R35 and R36 respectively onto line 79. Inductance L5 and capacitor C20 are combined with the internal components of the integrated circuit Z6 to form a reference oscillator.

The transmitter power switch 96 includes a transistor Q4 and a transistor Q5. When the signal on line 95 from the $\overline{Q}$ output of flip-flop 94 goes to a low level, transistor Q4 is saturated, thereby causing current to flow through the voltage divider R37, R38. This in turn causes transistor Q5 to saturate and thereby provide a supply voltage on line 97 from its collector to energize the cordless unit when in the call mode. The voltage on line 97 is regulated by resistor R39 and zener diode CR5.

When the signal from the $\overline{Q}$ output of flip-flop 94 goes to a high level, a network consisting of diode CR6, resistor R40 and capacitor C21 provides a pulse to the SET input of flip-flop 84 which produces a high level signal at the Q output of flip-flop 84. This in turn causes transistor Q6 of the standby power control 88 to conduct and thereby resume standby power to the cordless telephone.

Reference symbol 180 designates a battery charging jack.

With reference to the receiver module 43, the crystal filter 44 includes two 2-pole cascaded filters FL2 and FL3 having less than 1 $db$ of insertion loss and a 14 KHz bandwidth. The input and output impedances are 1300 ohms.

In the RF amplifier 46, the gain of the signal cascaded amplifiers, (transistors Q7, Q8 and Q9) is approximately 40 $db$.

The voltage appearing at the gate of the dual MOS FET Q10 in the mixer 48 is 140 $\mu v$/meter. This level is large enough to overcome mixer noise and to yield a signal to noise ratio of 0.6 $\mu v$ for 20 $db$ quieting. The lower gate 182 of the FET Q10 is driven by a modified pierce crystal oscillator 50 at 455 KHz below the center frequency of the receiver. The output of the mixer 48 is fed on line 184 to the bandpass filter 52.

The bandpass filter 52 consists of a 4-pole ceramic filter FL4 having a center frequency of 455 KHz and a bandwidth of 14 KHz.

The limiter and discriminator circuit 54 includes a model TBA120S integrated circuit Z7 which serves as an FM limiter having 50 $\mu v$ from 3 $db$ limiting sensitivity. Integrated circuit Z7 also contains a doubly balanced mixer which is combined with inductance L6 and capacitor C22 to form the discriminator. The audio output appears at pin 8 of integrated circuit Z7.

The de-emphasis network 56 has a transfer function which, when multiplied by the transfer function of the pre-emphasis network 32, will yield unity throughout the 2500 Hz audio bandwidth.

The power amplifier 58 is a class AB degenerative feedback power amplifier. Operational amplifier Z8 feeds a complementary transistor pair Q11 and Q12, with capacitive coupling through capacitor C24 to a 150 ohm load connected to the negative part of the operational amplifier Z8 to prevent distortion and excessive gain. Diodes CR7 and CR8 and resistor R41 set up a residual low level bias to minimize crossover distortion.

When a 1470 Hz ring signal with an amplitude of at least approximately 0.25 volts is passed through the active bandpass filter 62 and then rectified by diode CR9 in the detector 64, a low level signal will occur at the output of operational amplifier Z9 in comparator 66. The threshold of the comparator 66 is set by the voltage divider R42, R43, R44.

The low level output signal on line 69 from the comparator 66 enables the power amplifier 58 to pass the ring signal to the speaker 60.

The active bandpass filter 62 is active only during the "standby" mode. Diode CR10 couples the supply voltage to the positive input of the operational amplifier Z10 when the cordless telephone is in the "call" mode, thereby causing the output signal on lines 69 and 71 from the comparator 66 to remain at a low level; thus enabling the provision of audio to the speaker.

During the "standby" mode, a free running pulse generator made up of the operational amplifier Z11, transistor Q13 and their associated circuitry applies power on line 73 to the receiver module at a rate of approximately 1.8 seconds and a pulse width of approximately 40 msec. If the 1470 Hz ring signal is not detected within the 40 msec pulse time, the free running pulse generator will remove power for 1.8 seconds and then repeat sampling for detection of the ring signal. If a ring signal is detected during the 40 msec. pulse time, a low level output signal is provided from the comparator 66 on line 71 to the "+" terminal of the operational amplifier Z11, thereby causing the pulse generator to supply a continuous voltage on line 73 to the receiver module 43 for as long as the ring signal is present.

The pulse generator operates by comparing the level of the signal from the comparator at pin 3 of the operational amplifier Z11, with the charge on capacitor C25 at pin 2 thereof Z11. When the charge on capacitor C25 builds up the output signal at pin 1 of Z11 goes low thereby causing the reference level on pin 3 of Z11 to be much lower and allowing capacitor C25 to discharge for a time determined by the drop across diode CR11 and the time constant of capacitor C25 and resistor R45. The switching differentials are set for ⅔ and ⅓ of the supply voltage. The duty cycle of the pulse generator is determined primarily by the ratio of resistances R45 and R46. The 40 msec. low level voltage at pin 1 of Z11 causes the transistor Q13 to conduct and apply battery voltage to the receiver module 43 on line 73. Each time a pulse is provided to the receiver, a light emitting diode 22 (FIG. 6b) is turned on by current passing through the resistor R47 of OR gate 98.

The schematic circuit diagram of the base unit is shown in FIG. 7.

The receiver module 104 is identical to the receiver module 43 in the cordless telephone except for the difference in center frequencies.

Likewise, except for the difference in center frequencies, the VCXO and tripler 135, the final stage amplifier 136 and the bandpass filter 138 are identical to their corresponding components 38, 40, 42 in the cordless telephone transmitter circuit.

The active bandpass filter 106 includes a potentiometer R2, resistors R48, R49, R50 and R51, capacitors C26, C27 and C28 and operational amplifiers Z12 and Z13. The active bandpass filter 106 separates the 30 Hz low frequency discrete control signal from the composite signal received from the receiver module 104 on line 105. The bandwidth of the filter 106 is determined by the equation:

$$BW = \tfrac{1}{2} \pi\, R48\, C26.$$

The center frequency may be adjusted with potentiometer R2 and conforms to the equation:

$$f_c = \tfrac{1}{2} \pi\, [(R2 + R49)\, C26\, R50\, C28]^{\tfrac{1}{2}}.$$

The gain of the filter 106 from its input on line 105 to its output on line 107 is unity. The filter 106 appears as a single tuned inductor capacitor network with $Q = f_c/BW$. The parameters of the filter 106 are:

$$BW = 1.5 \text{ Hz}$$

$$f_c = 30 \text{ Hz}$$

$$\text{Gain} = 1.$$

Amplifier 108 is an inverting amplifier having a gain of 3.4. Amplifier 108 includes an operational amplifier Z14, resistors R52, R53 and R54 and a capacitor C29.

The full wave detector 110 performs the function of a full wave rectifier. It includes an operational amplifier Z15 diodes CR12 and CR13, resistors R55, R56 and R57 and capacitor C30.

The comparator 112 has a low pass filter at its input having a 1.4 second time constant as determined by resistor R58 and capacitor C31. A DC voltage is generated from the 30 Hz signal that appears at the "−" input terminal of voltage comparator Z16. The reference voltage at the "+" input terminal of the comparator may be adjusted with potentiometer R59. This is adjusted so that a received signal with a 1.5 KHz peak-to-peak deviation will appear at the "−" input terminal with a 2:1 excess voltage to cause the comparator Z16 output to approach zero. This low level causes transistor Q14 to saturate thereby actuating relay 100 to close switch 101 and seize the telephone lines 102 and 103.

When the transistor saturates to actuate relay 100, a high level signal is provided on line 113. The high level signal on line 113 drives gating diode CR14 within OR gate 124 and enables the power switch 126 to provide DC power on line 127 to the transmitter and audio sections of the base unit. The power switch includes transistors Q15 and Q16 and resistors R60, R61, R62 and R63.

The high level signal on line 113 also drives gating diode CR15 in the audio amplifier 115 to enable an audio signal path to be completed by returning operational amplifier Z17 to its normal quiescent operating point.

The high level signal on line 113 further forward biases gating diode CR16 of the inhibit element 130, which causes the operational amplifier Z18 in the ring oscillator 128 to be saturated, thereby inhibiting the ring oscillator 128. The ring oscillator 128 also includes resistors R64, R65, R66, R67 and R68 and capacitor C32. The ring oscillator is similar to the 30 Hz oscillator in the cordless telephone, except that its normal center frequency is 1470 Hz.

The ring oscillator may be actuated when a normal telephone ring voltage signal (60 to 100 volts AC at 20 Hz) appearing across telephone lines 102 and 103 is detected by the high impedance detector 120. The high impedance detector 120 includes a comparator Z21, resistors R79, R80, R81, R82 and R83, capacitors C37, C38 and C39 and diodes CR17 and CR18. The AC impedance that is seen looking into the telephone lines 102 and 103 is greater than 1 megaohm to ground. The DC resistance from either telephone line 102, 103 to ground is greater than 1000 megohms. The ring voltage is rectified and 20 Hz full half wave pulses appear at the junction of resistors R82 and R83. A 0.1 second network time constant (as determined by R83 and C39) prevents transients from triggering the comparator Z21. When the DC level at the "+" terminal of Z21 exceeds the reference level set by Q voltage divider R84, R85 a high level output signal is provided on line 121. This signal on line 121 passes through OR gate 124 to turn on the power switch 126 which in turn energizes the ring oscillator 128.

The high pass filter 116 in the audio section includes an operational amplifier Z19, resistors R70, R72, R72 and R73, and capacitors C33, C34 and C35. The filter 116 is a 2-pole active high pass filter which removes frequencies below 300 Hz, such as the 30 Hz low frequency discrete control signal and its harmonics. The parameters of the filter 116 follow:

$R72 = 1/6Q f_c C33$, and $R73 = 1.5Q/f_c C33$, where $f_c$ = cut off frequency = 300

$Q$ = 1, with 2 $db$ overshoot.

Amplifier 115 includes a non-inverting operational amplifier Z17 having a gain, which is the ratio of R74 to R69 = 10. The output of the amplifier 115 on line 190 presents a low impedance signal source to the electronic hybrid circuit 114.

The hybrid circuit 114 includes an operational amplifier Z20, resistors R75, R76, R77 and R78, capacitor C36 and transformer T2. The amplifier Z20 acts as a unity gain inverting amplifier (with R78/R76 = 1) with respect to the signal reflected from line 190 to line 133. Resistor 75 and the reflected secondary load from transformer T2 forms a voltage divider which couples the signal from line 190 through a low pass filter (having a cut off of 5000 Hz) to the non-inverting input terminal of the feedback amplifier Z20. When the resistance R75 is equal to the load that is reflected from the telephone lines 102, 103, the signal from line 190 propagating to line 133 will approach zero. If resistance R75 is not equal to the reflected load, then the signal which will appear on line 133 will be proportional to the mismatch between resistance R75 and the load. There will be some mismatch from the load on transformer T2 to the resistance R75 which yields some side tone to be fed from line 133 to the pre-emphasis and summation amplifier 134. The signal across the transformer T2 primary will be approximately one half of the signal appearing on line 190. The transformer T2 has a 1:1 turns ratio. Therefore, the load will see approximately one half of the signal level on line 190. When signals are provided from the telephone lines 102, 103, the signal on line 133 will be equal to twice the signal voltage appearing from the junction of resistors R75 and R77 to ground (the open circuit voltage of the source from the telephone lines 102, 103).

In the pre-emphasis and summation amplifier 134, the preamplifier includes operational amplifier Z22, resistors R86, R87 and R88 and capacitor C40, with resistor R88 being used to set the modulation level. The pre-emphasis network includes operational amplifier Z23, resistors R90, R91, R92 and R93 and capacitors C41, C42 and C43.

Having described my invention, I now claim:

1. A cordless telephone system comprising:
a. a base unit for connection to telephone lines, said unit including means for transmitting and receiving telephone switching signals and audio signals to and from a cordless telephone; and
b. a cordless telephone, including,
a speaker and a microphone,
means for transmitting and receiving telephone switching signals and audio signals to and from the base unit,
first control means for enabling and inhibiting energization of the cordless telephone to enable and inhibit the cordless telephone to receive and detect a "ring" signal from the base unit and to provide said ring signal to the speaker; and
second control means for enabling and inhibiting the transmitting means in the cordless telephone, and for enabling and inhibiting the receiving means in the cordless telephone to provide audio signals from the base unit to the speaker:

CHARACTERIZED BY
the cordless telephone comprising a touch-tone signal generator module for generating switching signals, said module including ten buttons for initiating the generation of signals representing ten numeric characters, and two additional buttons,
wherein one of the two additional buttons is adapted for operating the first control means, and
the second additional button is adapted for operating the second control means.

2. A cordless telephone system, comprising:
a. a base unit for connection to telephone lines, said unit including
means for transmitting and receiving signals to and from a cordless telephone,
means for passing said received signals that are within a given audio frequency band onto the telephone lines,
means for detecting a discrete control signal received from the cordless telephone and for enabling the base unit to seize the telephone lines in response thereto; and
b. a cordless telephone, including
means for transmitting and receiving signals to and from the base unit, and
means for generating said discrete control signal for transmission to the base unit;

CHARACTERIZED BY
the discrete signal generating means and the detecting means being adapted for respectively generating and detecting a said discrete control signal having a low frequency within a frequency range below said given audio frequency band; and
the cordless telephone transmitting means comprising means for preventing intermodulation of said discrete control signal and transmitted signals within said given audio frequency band.

3. The cordless telephone system according to claim 2, characterized by:
the discrete control signal generating means comprising a tunable oscillator for selecting a predetermined low frequency for said discrete control signal; and
the detecting means comprising a tunable active filter for detecting discrete control signals within a narrow band containing said selected predetermined low frequency.

4. The cordless telephone system according to claim 2, wherein the cordless telephone includes means for generating and transmitting dialing pulse signals to the base unit and the base unit includes means for passing said dialing pulse signals onto the telephone lines, characterized by
a. the cordless telephone comprising:

means for generating a second discrete control signal for transmission to the base unit, said second discrete control signal having a frequency within or above said given audio frequency band, and means for enabling the cordless telephone for transmitting said second discrete control signals and said dialing pulse signals only when both are simultaneously generated, and b. the base unit comprising:

means for detecting said second discrete control signal, and means for enabling said dialing pulse signals to be placed onto the telephone lines only when said second discrete control signal is detected.

5. The cordless telephone system according to claim 2, wherein the cordless telephone includes means for generating and transmitting dialing pulse signals to the base unit and the base unit includes means for passing said dialing pulse signals onto the telephone lines, characterized by a. the cordless telephone comprising:

a touch button pad having ten buttons for initiating the generation of dialing pulse signals representative of ten numeric characters, means for electronically generating dialing pulse signals in response to operation of said ten buttons, means for generating a second discrete control signal for transmission to the base unit, said second discrete control signal having a frequency within or above said given audio frequency band, and means for enabling the cordless telephone for transmitting said second discrete control signals and said dialing pulse signals only when both are simultaneously generated, and b. the base unit comprising:

means for detecting said second discrete control signal, and means for enabling said dialing pulse signals to be placed onto the telephone lines only when said second discrete signal is detected.

6. The cordless telephone system according to claim 2, wherein the cordless telephone transmitting means comprises:

means for providing an RF carrier signal, means for summing said discrete control signal with signals within said given audio frequency band to provide a composite signal, and means for frequency modulating said carrier signal with said composite signal,

CHARACTERIZED BY the means for preventing intermodulation comprising means for providing a linear frequency deviation in response to amplitude variations in said composite signal.

7. The cordless telephone system according to claim 6, characterized by the frequency modulating means comprising a voltage controlled crystal oscillator including:

a first resistance, a first varactor in series with the first resistance with its cathode connected to the first resistance, a second resistance connected between the first varactor cathode and an electrical ground for providing a high resistance current return path for the first varactor, a second varactor having its cathode connected to the cathode of the first varactor of the first varactor and its anode coupled to said ground, a third resistor connected between the second varactor anode and said ground for providing a high resistance current return path for the second varactor, an inductance connected to the second varactor anode, a piezoelectric crystal having a series natural resonance frequency connected in series with the inductance, an active transistor having its base connected in series with the crystal and its emitter capacitively coupled to said ground, and a capacitor connected between the base and emitter of the transistor for sustaining said frequency modulated signal;

wherein the linear frequency deviation is provided by the varactors not having any DC bias, and the inductance being capacitively coupled to said ground and having a value for causing the crystal to oscillate in a frequency range below its series natural resonance frequency, whereby when the capacitance of the first varactor increases in response to a negative going amplitude of the composite signal becoming more negative, the first resistance combines with the impedance of the first varactor to attenuate the amplitude of the composite signal.

8. A cordless telephone for use in a telephone system with a base unit that is connected to telephone lines for transmitting and receiving telephone switching signals and audio signals between the telephone lines and the cordless telephone, the cordless telephone comprising:

a speaker and a microphone; and means for transmitting and receiving telephone switching signals and audio signals to and from the base unit, first control means for enabling and inhibiting energization of the cordless telephone to enable and inhibit the cordless telephone to receive and detect a "ring" signal from the base unit and to provide said ring signal to the speaker; and second control means for enabling and inhibiting the transmitting means in the cordless telephone, and for enabling and inhibiting the receiving means in the cordless telephone to provide audio signals from the base unit to the speaker;

CHARACTERIZED BY the cordless telephone comprising a touch-tone signal generator module for generating switching signals, said module including ten buttons for initiating the generation of signals representing ten numeric characters, and two additional buttons, wherein one of the two additional buttons is adapted for operating the first control means, and the second additional button is adapted for operating the second control means.

9. A cordless telephone for use in a telephone system with a base unit that is connected to telephone lines for transmitting and receiving signals that are within a given audio frequency band between the telephone lines and the cordless telephone, said base unit including means for detecting a discrete control signal received from the cordless telephone and for enabling the base unit to seize the telephone lines in response thereto; the cordless telephone comprising:

means for transmitting and receiving signals to and from the base unit, and means for generating said discrete control signal for transmission to the base unit;

CHARACTERIZED BY the discrete signal generating means being adapted for generating said discrete control signal having a low frequency within a frequency range below said given audio frequency band; and the cordless telephone transmitting means comprising means for preventing intermodulation of said discrete control signal and transmitted signals within said given audio frequency band.

10. The cordless telephone according to claim 9, characterized by the discrete signal generating means comprising a tunable oscillator for selecting a predetermined low frequency for said discrete control signal.

11. The cordless telephone according to claim 9, wherein the cordless telephone includes means for generating and transmitting dialing pulse signals for use with a said base unit that includes means for passing said dialing pulse signals onto the telephone lines, characterized by the cordless telephone comprising:

means for generating a second discrete control signal for transmission to the base unit, said second discrete control signal having a frequency within or above said given audio frequency band, and means for enabling the cordless telephone for transmitting said second discrete control signals and said dialing pulse signals only when both are simultaneously generated.

12. The cordless telephone according to claim 9, wherein the cordless telephone includes means for generating and transmitting dialing pulse signals for use with a said base unit that includes means for passing said dialing pulse signals onto the telephone lines, characterized by the cordless telephone comprising:

a touch button pad having ten buttons for initiating the generation of dialing pulse signals representative of ten numeric characters, means for electronically generating dialing pulse signals in response to operation of said ten buttons, means for generating a second discrete control signal for transmission to the base unit, said second discrete control signal having a frequency within or above said given audio frequency band, and means for enabling the cordless telephone for transmitting said second discrete control signals and said dialing pulse signals only when both are simultaneously generated.

13. The cordless telephone according to claim 9, wherein the cordless telephone transmitting means comprises:

means for providing an RF carrier signal, means for summing said discrete control signal with signals within said given audio frequency band to provide a composite signal, and means for frequency modulating said carrier signal with said composite signal,

CHARACTERIZED BY the means for preventing intermodulation comprising means for providing a linear frequency deviation in response to amplitude variations in said composite signal.

14. The cordless telephone according to claim 13, characterized by the frequency modulating means comprising a voltage controlled crystal oscillator including:

a first resistance, a first varactor in series with the first resistance with its cathode connected to the first resistance, a second resistance connected between the first varactor cathode and an electrical ground for providing a high resistance current return path for the first varactor, a second varactor having its cathode connected to the cathode of the first varactor of the first varactor and its anode coupled to said ground, a third resistor connected between the second varactor anode and said ground for providing a high resistance current return path for the second varactor, an inductance connected to the second varactor anode, a piezoelectric crystal having a series natural resonance frequency connected in series with the inductance, an active transistor having its base connected in series with the crystal and its emitter capacitively coupled to said ground, and a capacitor connected between the base and emitter of the transistor for sustaining said frequency modulated signal;

wherein the linear frequency deviation is provided by the varactors not having any DC bias, and the inductance being capacitively coupled to ground and having a value for causing the crystal to oscillate in a frequency range below its series natural resonance frequency, whereby when the capacitance of the first varactor increases in response to a negative going amplitude of the composite signal becoming more negative, the first resistance combines with the impedance of the first varactor to attenuate the amplitude of the composite signal.

* * * * *